US012363539B2

(12) United States Patent
Pietarinen et al.

(10) Patent No.: US 12,363,539 B2
(45) Date of Patent: Jul. 15, 2025

(54) METHOD AND SYSTEM FOR DETECTING ANOMALY IN RADIO ACCESS NETWORK

(71) Applicant: Elisa Oyj, Helsinki (FI)

(72) Inventors: Jukka Pietarinen, Helsinki (FI); Teemu Karhima, Helsinki (FI)

(73) Assignee: Eilsa Oyj, Helsinki (FI)

( * ) Notice: Subject to any disclaimer, the term of this patent is extended or adjusted under 35 U.S.C. 154(b) by 0 days.

(21) Appl. No.: 18/841,847

(22) PCT Filed: Apr. 25, 2023

(86) PCT No.: PCT/FI2023/050225
§ 371 (c)(1),
(2) Date: Aug. 27, 2024

(87) PCT Pub. No.: WO2023/209280
PCT Pub. Date: Nov. 2, 2023

(65) Prior Publication Data
US 2025/0071553 A1  Feb. 27, 2025

(30) Foreign Application Priority Data
Apr. 28, 2022 (FI) .................................... 20225359

(51) Int. Cl.
H04W 12/122 (2021.01)
H04W 24/08 (2009.01)
(52) U.S. Cl.
CPC ......... H04W 12/122 (2021.01); H04W 24/08 (2013.01)
(58) Field of Classification Search
CPC ............................ H04W 12/122; H04W 24/08
See application file for complete search history.

(56) References Cited

U.S. PATENT DOCUMENTS 7,006,838 B2 * 2/2006 Diener .................. H04W 24/00
455/457
7,260,408 B2 * 8/2007 Friday .................... H04B 17/27
342/357.43

(Continued)

FOREIGN PATENT DOCUMENTS

WO 2021094221 A1 5/2021
WO 2022003490 A1 1/2022

OTHER PUBLICATIONS

Ali et al., "Enabling Fake Base Station Detection through Sample-based Higher Order Noise Statistics", 2019 42nd International Conference on Telecommunications and Signal Processing, Jul. 1, 2019, DOI: 10.1109/TSP.2019.8769046, 6 pages.

(Continued)

Primary Examiner — Michael W Chao
(74) Attorney, Agent, or Firm — ZIEGLER IP LAW GROUP, LLC.

(57) ABSTRACT

Disclosed is a system and a method for detecting anomaly in a radio access network (RAN). The method includes receiving quality parameters data for a wide communication network established by plurality of base stations associated with the RAN; defining a first radio fingerprint based on the quality parameters data for the wide communication network; monitoring, by one of the base stations installed in a geological area, quality parameters data for a local communication network; defining a second radio fingerprint based on the quality parameters data for the local communication network; comparing the first radio fingerprint and the second radio fingerprint to determine variation in the quality parameters data therebetween; and generating an alert signal indicative of presence of a possible fake base station in the geological area based on the determined variation in the quality parameters data.

9 Claims, 4 Drawing Sheets

(56) References Cited

U.S. PATENT DOCUMENTS

| | | | | |
|---|---|---|---|---|
| 7,808,958 | B1* | 10/2010 | Hernacki | H04W 12/122 370/252 |
| 8,200,242 | B2* | 6/2012 | Dietrich | H04W 64/00 455/456.6 |
| 11,012,927 | B2* | 5/2021 | Justin | G06F 3/02 |
| 11,159,980 | B2* | 10/2021 | Mishra | H04L 47/6275 |
| 11,243,983 | B2* | 2/2022 | De | H04W 12/122 |
| 11,743,763 | B2* | 8/2023 | Papa | H04W 28/0289 370/230 |
| 2004/0176108 | A1* | 9/2004 | Misikangas | H04W 64/00 455/423 |
| 2009/0267735 | A1* | 10/2009 | Kim | H04L 63/0861 340/5.83 |
| 2012/0124665 | A1* | 5/2012 | Dubey | H04L 63/14 726/22 |
| 2016/0124071 | A1 | 5/2016 | Baxley et al. | |
| 2017/0026859 | A1* | 1/2017 | Ahmadzadeh | H04W 24/08 |
| 2018/0070228 | A1 | 3/2018 | Goldfarb et al. | |
| 2018/0070239 | A1 | 3/2018 | Norrman et al. | |
| 2019/0132787 | A1* | 5/2019 | Ryan | H04W 12/12 |
| 2019/0327614 | A1* | 10/2019 | Homchaudhuri | H04W 48/08 |
| 2019/0380043 | A1* | 12/2019 | Hassan | G06F 21/554 |
| 2020/0200865 | A1* | 6/2020 | Wirola | H04W 12/122 |
| 2021/0092611 | A1* | 3/2021 | Pasricha | H04W 4/33 |
| 2022/0182412 | A1* | 6/2022 | Borak | H04L 63/1491 |
| 2023/0034609 | A1* | 2/2023 | Huang | H04W 12/122 |
| 2024/0129210 | A1* | 4/2024 | Amini | H04L 43/024 |

OTHER PUBLICATIONS

European Patent Office, Written Opinion of the International Searching Authority and International Search Report and Notification of Transmittal of The International Search Report and the Written Opinion of the International Searching Authority, or the Declaration, International Application No. PCT/FI2023/050225, Mailed Jul. 6, 2023, 15 Pages.

Finnish Patenet and Registration Office, Decision Patent Granted, Application No. 20225359, Dated May 24, 2024, 2 Pages.

Finnish Patent and Registration Office, Search Report, Patent Application No. 20225359, Dated Nov. 16, 2022, 2 Pages.

* cited by examiner

METHOD AND SYSTEM FOR DETECTING ANOMALY IN RADIO ACCESS NETWORK

TECHNICAL FIELD

The present disclosure relates generally to anomaly detection in communication networks; and more specifically, to a method and a system for detecting presence of a possible fake base station in a geological area for a radio access network.

BACKGROUND

Wireless communication networks employ various air interfaces between user equipment (UE) and the fixed infrastructure. Such network architectures include two major sub-networks: (a) the radio access network (RAN), and (b) the Core Network (CN). The RAN controls the radio physical aspects of the UE, and the CN controls the UE's access to applications supported by the wireless service provider or external public or private networks, such as the Internet. Further, the traditional RAN has two major components, the base station (BS) and the base station controller (BSC). The RAN usually includes a multitude of base station and base station controller associations depending on system capacity and geographical area.

It may be possible for a malicious attacker to install a fake (pseudo) base station in the same geographical area. Basically, a fake base station in a communication network is a wireless access point that has been maliciously added without explicit authorization from a local network administrator. With a fake base station, the attacker can compromise the communication of one or more users by performing a man-in-the-middle attack between the UE and the real base station. Herein, on one hand, such fake base station may pose as a "real" base station with the strongest signal towards the UE and, on the other hand, it may act as a UE towards the core network (and towards the actual real base station).

So far there are no widely available solutions known to reliably detect a fake base station. Current solutions require some action from the UE which may not always be possible to execute or get access by the wireless service provider, since different UE manufacturers may implement different security policies. Some special hardware based solutions have been proposed, such as installing wireless intrusion prevention systems to monitor the radio spectrum for unauthorized access points; but such solutions may not always be viable and would be way too expensive to cover large geographical areas, such as an entire country.

Therefore, in light of the foregoing discussion, there exists a need to overcome the aforementioned drawbacks associated with the conventional communication networks such as RANs, and provide a method and a system for detecting an anomaly in the RAN in an inexpensive and efficient manner without relying on external sources and/or requiring installation of additional components, or the like.

SUMMARY OF THE INVENTION

The present disclosure seeks to provide a method for detecting anomaly in a radio access network (RAN). The present disclosure also seeks to provide a system for detecting anomaly in the RAN. An aim of the present disclosure is to provide a solution that overcomes at least partially the problems encountered in prior art. In particular, to overcome the aforementioned problems, the system and the method of the present disclosure enables detection of presence of a possible fake base station in a geological area using measurements from existing associated base station(s) itself. As a result, the problem of detecting irregularities in the radio access network (RAN) in an efficient manner without relying on the external sources and/or requiring installation of additional components is achieved.

In one aspect, an embodiment of the present disclosure provides a method for detecting anomaly in a radio access network (RAN), the method comprising:
  receiving quality parameters data for a wide communication network established by plurality of base stations associated with the RAN;
  defining a first radio fingerprint based on the quality parameters data for the wide communication network, wherein defining the first radio fingerprint comprises:
    isolating the quality parameters data for one or more base stations, of the plurality of base stations, installed in the geological area from the received quality parameters data for the wide communication network, wherein the quality parameters data is isolated by using clustering algorithm; and
    defining the first radio fingerprint based on the said isolated quality parameters data;
  monitoring, by one of the base stations, of the plurality of base stations, installed in a geological area, quality parameters data for a local communication network, wherein the local communication network is a subset of the wide communication network;
  defining a second radio fingerprint based on the quality parameters data for the local communication network;
  comparing the first radio fingerprint and the second radio fingerprint to determine variation in the quality parameters data therebetween; and
  generating an alert signal indicative of presence of a possible fake base station in the geological area based on the determined variation in the quality parameters data.

In another aspect, an embodiment of the present disclosure provides a system for detecting anomaly in a radio access network (RAN) comprising a plurality of base stations, the system comprising:
  a plurality of data collection devices, with each of the plurality of data collection devices coupled with one of the plurality of base stations associated with the RAN, wherein the plurality of data collection devices are configured to, collectively, monitor quality parameters data for a wide communication network established by the plurality of base stations;
  wherein each of the plurality of data collection devices is configured to monitor quality parameters data for a local communication network corresponding to one of the base stations, of the plurality of base stations, installed in a geological area, wherein the local communication network is a subset of the wide communication network; and
  a data processing arrangement configured to:
    receive the quality parameters data for the wide communication network;
    define a first radio fingerprint based on the quality parameters data for the wide communication network, wherein the data processing arrangement is configured to:
      isolate the quality parameters data for one or more base stations, of the plurality of base stations, installed in the geological area from the received quality parameters data for the wide communication network, wherein the data processing arrangement is configured to isolate the quality parameters data by using clustering algorithm; and define the first radio fingerprint based on the said isolated quality parameters data;

receive the quality parameters data for the local communication network;

define a second radio fingerprint based on the quality parameters data for the local communication network;

compare the first radio fingerprint and the second radio fingerprint to determine variation in the quality parameters data therebetween; and generate an alert signal indicative of presence of a possible fake base station in the geological area based on the determined variation in the quality parameters data.

In yet another aspect, an embodiment of the present disclosure provides a computer program comprising computer executable program code which when executed by a data processing arrangement causes a system to perform the method as described above.

Embodiments of the present disclosure substantially eliminate or at least partially address the aforementioned problems in the prior art and enable efficient and timely anomaly detection, or specifically presence of a possible fake base station in a geological area, without being relied on user equipment and/or installation of additional components.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
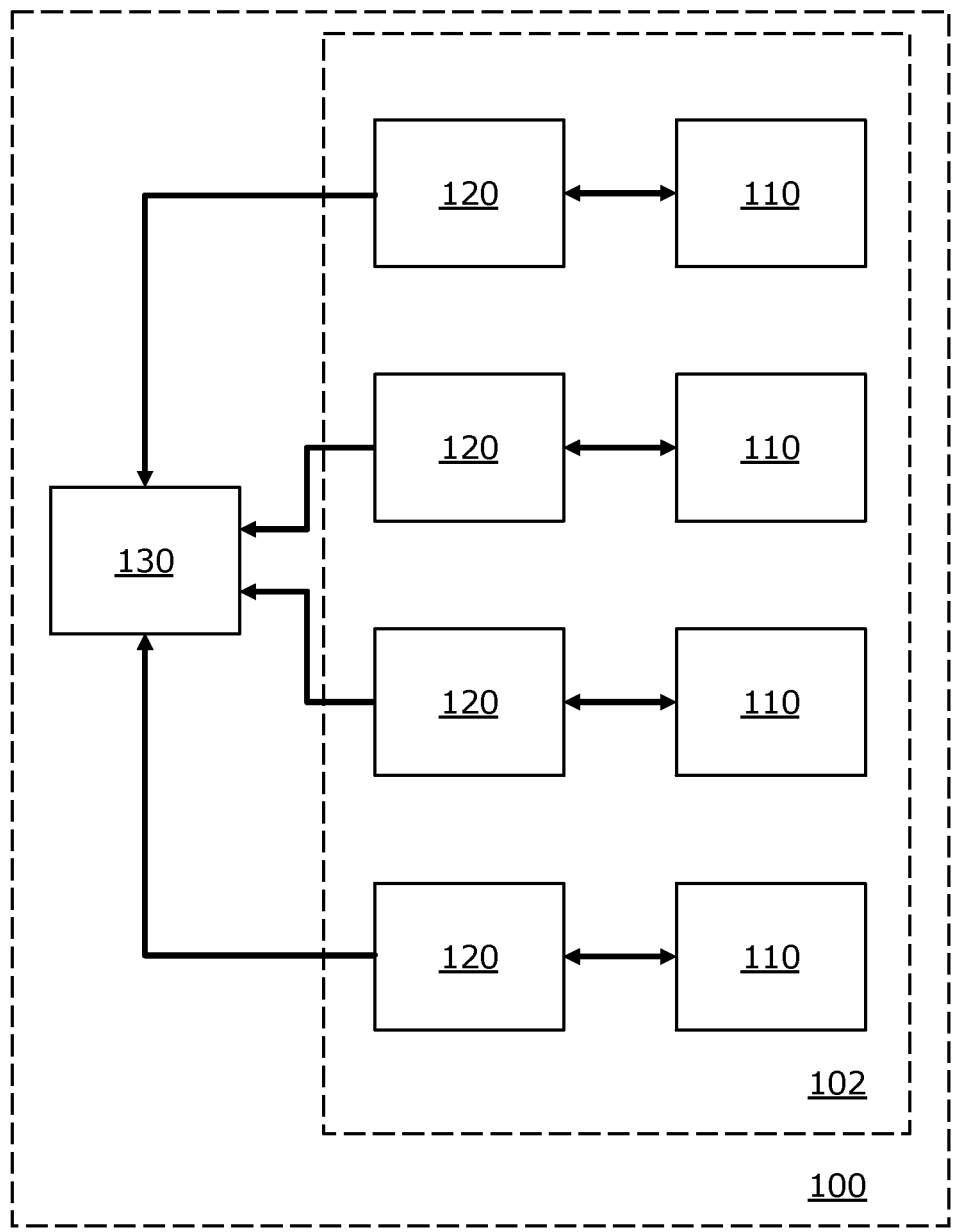
FIG. 1 is a block diagram illustration of a system for detecting anomaly in a radio access network, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method for detecting anomaly in a radio access network (RAN), the method comprising:

receiving quality parameters data for a wide communication network established by plurality of base stations associated with the RAN;

defining a first radio fingerprint based on the quality parameters data for the wide communication network, wherein defining the first radio fingerprint comprises:

isolating the quality parameters data for one or more base stations, of the plurality of base stations, installed in the geological area from the received quality parameters data for the wide communication network, wherein the quality parameters data is isolated by using clustering algorithm; and defining the first radio fingerprint based on the said isolated quality parameters data;

monitoring, by one of the base stations, of the plurality of base stations, installed in a geological area, quality parameters data for a local communication network, wherein the local communication network is a subset of the wide communication network;

defining a second radio fingerprint based on the quality parameters data for the local communication network;

comparing the first radio fingerprint and the second radio fingerprint to determine variation in the quality parameters data therebetween; and generating an alert signal indicative of presence of a possible fake base station in the geological area based on the determined variation in the quality parameters data.

In another aspect, an embodiment of the present disclosure provides a system for detecting anomaly in a radio access network (RAN) comprising a plurality of base stations, the system comprising:

a plurality of data collection devices, with each of the plurality of data collection devices coupled with one of the plurality of base stations associated with the RAN, wherein the plurality of data collection devices are configured to, collectively, monitor quality parameters data for a wide communication network established by the plurality of base stations;

wherein each of the plurality of data collection devices is configured to monitor quality parameters data for a local communication network corresponding to one of the base stations, of the plurality of base stations, installed in a geological area, wherein the local communication network is a subset of the wide communication network; and a data processing arrangement configured to:
  receive the quality parameters data for the wide communication network;
  define a first radio fingerprint based on the quality parameters data for the wide communication network, wherein the data processing arrangement is configured to:
    isolate the quality parameters data for one or more base stations, of the plurality of base stations, installed in the geological area from the received quality parameters data for the wide communication network, wherein the data processing arrangement is configured to isolate the quality parameters data by using clustering algorithm; and
    define the first radio fingerprint based on the said isolated quality parameters data;
  receive the quality parameters data for the local communication network;
  define a second radio fingerprint based on the quality parameters data for the local communication network;
  compare the first radio fingerprint and the second radio fingerprint to determine variation in the quality parameters data therebetween; and
  generate an alert signal indicative of presence of a possible fake base station in the geological area based on the determined variation in the quality parameters data.

In yet another aspect, an embodiment of the present disclosure provides a computer program comprising computer executable program code which when executed by a data processing arrangement causes a system to perform the method as described above.

The present disclosure provides a method and a system for detecting an anomaly in a radio access network (RAN). The system and the method of the present disclosure enables detection of presence of a possible fake base station in a geological area using measurements from existing associated base station(s) itself. As a result, the problem of detecting any irregularity/anomaly in the radio access network (RAN) in an efficient manner without relying on the external sources and/or requiring installation of additional components is achieved.

The RAN, which is generally an access network, acts as the radio element of cellular telecommunications systems. For the purposes of the present disclosure, the RAN is considered to be any wireless communication network related to the telecommunications systems, that connects individual devices to other parts of a network through a radio link. In particular, the RAN links user equipment (UE), such as a cell phone, computer, or any remotely controlled machine, over a wireless connection. Such link goes to the core network, which manages subscriber information, location and more. The RAN provides access to and coordinates the management of resources across the radio sites. Herein, the user equipment is wirelessly connected to the backbone, or core network, and the RAN sends its signal to various wireless endpoints so it may travel with traffic from other networks.

The RAN comprises a plurality of base stations that cover a specific region, such as a city, or an entire country, depending on their capacity. Herein, the base stations provide a set of signal processing functions that make wireless communication possible. Traditionally, the base stations use custom electronics combined with multiple lines of code to enable wireless communication, typically using the licensed radio spectrum. Specifically, the base stations process the radio signals to detects errors, secures the wireless signal and ensures that wireless resources are used effectively. As may be understood, each base station, of the plurality of base stations, may be installed in a specific geological location within the said region, to cover a particular geological area in the said region. The base stations may be distributed in the region in any suitable manner as known in the art without any limitations.

The plurality of base stations may establish a communication network, herein referred to as a wide communication network, which may cover an entire region, such as a city, or an entire country. The said wide communication network, as established by the plurality of base stations associated with the RAN, may have its own unique parameters (properties) which may be utilized to characterize such communication network. Further each of the base stations, of the plurality of base stations, may establish (be part of) a local communication network covering the corresponding geological area, which would be a subset of the said region, in which it is installed. Herein, the local communication network is a subset of the wide communication network.

In the present disclosure, the system comprises a plurality of data collection devices. Each of the plurality of data collection devices is coupled with one of the plurality of base stations associated with the RAN. That is, with each of the plurality of base stations, one of the plurality of data collection devices may be connected. The data collection device is configured to monitor quality parameters data of radio waves of the communication network in a vicinity of the corresponding base station. For purposes of the present disclosure, the plurality of data collection devices are configured to, collectively, monitor quality parameters data for the wide communication network established by the corresponding plurality of base stations. That is, each of the plurality of data collection devices is configured to measure quality parameters data of radio waves of the wide communication network as established in the said region. Further, each of the plurality of data collection devices is configured to monitor quality parameters data for the local communication network corresponding to one of the base stations, of the plurality of base stations, installed in the geological area. Particularly, each of the plurality of data collection devices is configured to measure quality parameters data of radio waves of the local communication network present in the corresponding geological area of the base station coupled thereto.

In one or more embodiments, the quality parameters data comprise one or more of: Received Total Wideband Power (RTWP), Received Signal Strength Indicator (RSSI), Signal to Interference Noise Ratio (SINR), GPS location verification, GPS signal strength. Herein, the RTWP relates to received wideband power that the base station may measure from external sources, which normally corresponds to a transmitting power of the user equipment; RSSI relates to received signal power, which basically again corresponds to transmitting power of the user equipment; SINR relates to signal quality key performance indicator (KPI) corresponding to ratio of actual signal and received interference; GPS location verification relates to static location parameter; and GPS signal strength relates to synchronization signal strength. In some examples, the quality parameters data may also comprise other type of network event data or network counter data, including one or more of: throughput, cell availability, handover failure or success rate, reference signal received power (RSRP), reference signal received quality (RSRQ), and the like. Alternatively, or additionally, other suitable quality parameters data indicative of network performance may be utilized as the quality parameters data without any limitations.

In some examples, the data collection device may be integrated with the corresponding base station. For the said purposes, in an example, the data collection devices may be in the form of, but not limited to, antenna using amplifier and analog-to-digital converter (ADC) to determine intermediate frequency of the received signals from the communication network, and the like. As may be contemplated by a person skilled in the art, the functionality of the data collection device may be provided as an inherent feature of the corresponding base station and thus there may be no need to have any additional physical components being connected (coupled) to the base station, but rather the data collection device may be implemented as a software code (module) being executed by existing components of the base station to provide the said functionality thereof.

The system further comprises a data processing arrangement which performs the necessary processing steps for analysing the quality parameters data, and thereby detect the possible anomalies in the RAN.

Herein, the "data processing arrangement" refers to a computational element that is operable to respond to and processes instructions that drive the system for analysing the quality parameters data. In an embodiment, the data processing arrangement includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "data processing arrangement" may refer to one or more individual processors, processing devices and various elements associated with a processing device that may be shared by other processing devices. Additionally, the one or more individual processors, processing devices and elements are arranged in various architectures for responding to and processing the instructions that drive the system.

As discussed, the method and the system of the present disclosure are implemented for detecting anomaly in the RAN. Herein, the term "anomaly" has been used to refer to a behaviour deviating from a normal or expected behaviour, suggesting an underlying issue that leads to the generation of the anomaly. The present disclosure is configured to identify data points, events, and/or observations in the RAN that deviate from normal behaviour i.e., exhibit anomalous behaviour, wherein the anomalous behaviour may be indicative of presence of a possible fake base station in the geological areas corresponding to each of the plurality of base stations associated with the RAN. Thereby, the method and the system of the present disclosure provide techniques to improve security of the RAN for associated geological areas therein, by using quality measurement data of the wide communication network and fingerprinting variations in the local communication environment based thereon, and thereby enabling detection of presence of the possible fake base station in the geological area at least corresponding to the local communication environment.

The present disclosure provides improvements in terms of data components for the RAN and techniques for carrying out the comparison between data components in order to detect variation in the radio environment of the RAN which may indicate possible security threats (such as, presence of possible fake base station). Hereinafter, the embodiments of the present disclosure has been described in terms of the method for detecting anomaly in the RAN. The various embodiments and variants disclosed above apply mutatis mutandis to the present system without any limitations.

The method comprises receiving quality parameters data for a wide communication network established by plurality of base stations associated with the RAN. Herein, the data processing arrangement is configured to receive the quality parameters data for the wide communication network. As discussed, the data collection devices coupled to the base stations may monitor and provide the quality parameters data for the wide communication network. The quality parameters data for the wide communication network may be measured based on overall characteristics of radio waves in the region being covered by the RAN. Further, the plurality of data collection devices may be disposed in signal communication with the data processing arrangement to transmit the collected information related to the monitored quality parameters data for the wide communication network thereto.

The method further comprises defining a first radio fingerprint based on the quality parameters data for the wide communication network. Herein, the data processing arrangement is configured to define a first radio fingerprint based on the quality parameters data for the wide communication network. The defined radio fingerprint allows to identify a radio transmitter (in this case, the base stations) by its properties that characterizes its signal transmission. In other words, the first radio fingerprint makes it possible to identify the base station associated with the wide communication network of the RAN by its radio transmission characteristics. In an example, the first radio fingerprint may be defined based on configurations of the hardware components of the base stations, and resultant properties (such as, inherent non-linearities) of the communication signals of the wide communication network established thereby. Various other alternative techniques may be implemented for defining the radio fingerprint of communication networks as known in the art, which are generally beyond the scope of the present disclosure but may be contemplated by a person skilled in the art, and thus have not been described herein.

In an embodiment, the step of defining the first radio fingerprint comprises isolating the quality parameters data for one or more base stations, of the plurality of base stations, installed in the geological area from the received quality parameters data for the wide communication network; and defining the first radio fingerprint based on the said isolated quality parameters data. Herein, the data processing arrangement is configured to isolate the quality parameters data for one or more base stations, of the plurality of base stations, installed in the geological area from the received quality parameters data for the wide communication network; and define the first radio fingerprint based on the said isolated quality parameters data. It will be appreciated that isolating the quality parameters data for the specific one or more base stations installed in the geological area for which any anomaly is being detected (like presence of the fake base station in that geological area) and using the same for defining the first radio fingerprint, provides a better representation of the communication network established by the corresponding said one or more base stations in the said geological area as compared to the general radio fingerprinting of the entire region with the plurality of base stations associated with the RAN.

In an example embodiment, the quality parameters data is isolated by using clustering algorithm. Herein, the data processing arrangement is configured to isolate the quality parameters data by using clustering algorithm. That is, the quality parameters data for the communication network established by the said one or more base stations installed in the geological area to provide better radio fingerprinting for the said geological area (as described above) is isolated by using clustering algorithm. In the context of the present disclosure, clustering has the role of differentiating between the datapoints showcasing measures of magnitudes of the change points that are alike or similar in values, forming the main cluster and denoting the normal behaviour of the communication network and the outliers. The outliers are the datapoints that are falling outside the main clusters and likely to indicate anomalies in the respective communication network. There are various clustering algorithms that may be used for the said purpose, including, but not limited to, Isolation Forest, Principal Component Analysis (PCA) based methods, Hierarchical Density-Based Spatial Clustering of Applications with Noise (HDBSCAN), and the like.

As an example of a quality parameter which can be used is RTWP (Received total wideband power). This is in practice received wideband power that base stations can measure from external sources. Normally sending power of mobile phones. An other example is RSSI (Received signal strength indicator) that is received signal power. Normally sending power of mobile phones. Further example is SINR (Signal to interference noise ratio). SINR is Signal quality KPI describing ratio between actual signal and received interference. In addition GPS location verification (for example to used as Static location parameter) and GPS Signal strength (Synchronization signal strength).

For example GPS (or other GNSS) can be used. Indeed the location of base station is a stable ((as the base stations do not move) value that can be measured. Interference of satellite signal can be cause location change which can be noticed. In deed if the base station appears to move then there is interference in GPS signal. One possible fingerprint is a number of satellites in certain location. This number can be set as a value to monitor possible interference. Usually the number of satellites vary, but minimum level can set based on long term measurement of seen satellite. Minimum (or lover) number of satellites or lower values can be indication of interference. Also Carrier/Noise density ratio (C/NO) of GPS signal can be monitored to in order to noticed external interference of signal. Suddenly dropping values indicate possible interference. Usage of GPS in above manner is beneficial as the base station does not move thus providing stable baseline fingerprint value.

RTWP values can be used to form fingerprint by selecting a base line such as −105 dBm. Variations from the base line indicate possible variations. As an example value can change from −105 dBm to −90 dBm. RSSI base values can vary between each base station. The value is however relatively stable. In that regard RSSI baseline can be set as an individual value for each bases station. Variation from that individual value can be used as variation of the value. Based on experiments the RSSI value can vary significantly if there is interference. AS an example level can change from −130 dBm to −100 dBm.

The method further comprises monitoring, by one of the base stations, of the plurality of base stations, installed in a geological area, quality parameters data for a local communication network, wherein the local communication network is a subset of the wide communication network. Herein, the data processing arrangement is configured to receive the quality parameters data for the local communication network. For this purpose, first it may be decided for which geological area (hereinafter, sometimes, referred to as "target geological area") the analysis needs to be executed for determining of a possible fake station therein. Based on such decision, one of the base stations installed in such target geological area is selected to monitor the quality parameters data for the local communication network corresponding thereto. The data collection device coupled to the said one of the base stations may measure such quality parameters data for the local communication network. Further, the said data collection device, being disposed in signal communication with the data processing arrangement, may transmit the collected information related to the monitored quality parameters data for the local communication network to the data processing arrangement.

Herein, the process of selection of the target geological area may be manually or automatically triggered. In an example, the process may be triggered by a user (such as, a service engineer of the RAN) feedback. Such feedback may be reported for example by users through making a service complaint. Additionally, or alternatively, the process may be triggered, for example, in response to reported problems in the network. The process may be periodically repeated. The process may be repeated for example once a day, once a week, every two weeks, or once a month. By periodically repeating the process, effective monitoring and controlling of the RAN is achieved and anomalies (i.e., presence of fake base station in any of the geological area associated therewith), if any, may be timely detected. Still further, the process may be performed in connection with deployment of new base station site, deployment of new physical equipment in the base station site and/or maintenance actions performed in the base station site. In this way any anomalies in a site in which any new equipment is being deployed may be detected right away.

As may be contemplated, base stations are constantly measuring radio networks quality, and such measurement data is usually transmitted from the base stations to network management or network quality monitoring.

In an embodiment, the method comprises intermittently receiving the quality parameters data for the wide communication network after each first predefined interval of time. For this purpose, the plurality of data collection devices are configured to intermittently monitor the quality parameters data for the wide communication network after each first predefined interval of time. The method further comprises configuring the said one of the base stations installed in the geological area (target geological area) to monitor the quality parameters data for the local communication network after each second predefined interval of time, wherein the second predefined interval of time is smaller than the first predefined interval of time. Herein, each of the plurality of data collection devices is configured to monitor the quality parameters data for the corresponding local communication network after each second predefined interval of time, wherein the second predefined interval of time is smaller than the first predefined interval of time. In an example, the quality parameters data for the local communication network may be monitored constantly (i.e., as per measurement frequency of the data collection device). For instance, the quality parameters data for the wide communication network may be obtained after a certain period of time, say a day, a week, a month, a quarter, a year, or the like; while the quality parameters data for the local communication network may be obtained after every minute, every few minutes, every hour, every few hours, or the like. It may be appreciated that the given time periods are exemplary only and shall not be construed as limiting to the present disclosure in any manner. The idea here is that the quality parameters data for the wide communication network may be obtained less frequently as that may change occasionally (usually only after addition of some equipment in the RAN or change in some network settings of the RAN) and the quality parameters data for the local communication network may be obtained more frequently in order to detect changes therein due to any anomaly (like installation of possible fake base station in the corresponding geological area) as soon as possible.

The method further comprises defining a second radio fingerprint based on the quality parameters data for the local communication network. Herein, the data processing arrangement is configured to define a second radio fingerprint based on the quality parameters data for the local communication network. As discussed previously in relation to defining the first radio fingerprint for the wide communication network, the second radio fingerprint may be defined based on characteristics (such as, inherent non-linearities) of the communication signals of the local communication network as established in the target geological area. The defined second radio fingerprint may be representative of the local communication network including any interference that may have been caused by presence of any fake base station in the target geological region corresponding to the said local communication. As may be understood by a person skilled in the art that the defined first radio fingerprint for the wide communication network may provide somewhat of a standard, to which the defined second radio fingerprint for the local communication network may be compared to determine anomalies in the RAN, as discussed in the proceeding paragraphs in more detail.

The method further includes comparing the first radio fingerprint and the second radio fingerprint to determine variation in the quality parameters data therebetween. Herein, the data processing arrangement is configured to compare the first radio fingerprint and the second radio fingerprint to determine variation in the quality parameters data therebetween. As discussed, the quality parameters data are a time series of performance indicator data points collected at regular time intervals, e.g., hourly or daily samples over a selected time period. Herein, the selected time period may be of 30, 60, 90 days, or of any other suitable duration. When the first radio fingerprint and the second radio fingerprint are compared, the respective performance indicator data points from the corresponding quality parameters data on which the same are based are generally being compared, to determine the variation therebetween. Herein, the first radio fingerprint acts as the reference and the second radio fingerprint is evaluated thereagainst. It may be understood that the variation may be indicative of change points in time which marks a significant change in statistics, e.g., mean or standard deviation of the performance indicators time series. Alternatively, it can be interpreted as a shift in data.

In the present examples, with the quality parameters data comprising one or more of: Received Total Wideband Power (RTWP), Received Signal Strength Indicator (RSSI), Signal to Interference Noise Ratio (SINR), GPS location verification, GPS signal strength, the variation may be determined based on change in magnitude of any of the said parameters. For instance, in case of RTWP, the variation may be determined as an increase in total power if there is additional power sources in the target geological area associated with the RAN (e.g., due to presence of possible fake base station). In case of RSSI, the signal power may increase if there is additional power sources in the target geological area associated with the RAN (e.g., due to presence of possible fake base station). In case of SINR, the strength of radio signals may decrease because of interference in the target geological area associated with the RAN (e.g., due to presence of possible fake base station). In case of GPS location verification, the location changes for the base station in the target geological area may be noticed (e.g., due to presence of possible fake base station therein). In case of GPS signal strength, total signal loss or GPS synchronization issues may be identified when being compared to network synchronization signal (e.g., due to presence of possible fake base station therein).

In an embodiment, the determined variation having the highest magnitude of the change is identified and used for analysis. In another embodiment, only the variations indicating degradation in performance indicators values may be used for analysis. In some examples, the magnitude of the variation may be determined based on an absolute difference in values of the performance indicators. Alternatively, or additionally, the magnitude of the variation may be measured using a relative difference. Further, in an example, the magnitude of the variation may be calculated as a difference of mean values of the performance indicators before and after the change point. Alternatively, or additionally, a difference in standard deviation values of the performance indicators before and after the change point may be used to calculate the magnitude of the variation. The determined variation which is determined to be relevant may be indicative of significant variation and therefore a possible anomaly in the RAN, as discussed hereinafter.

In an example embodiment, the variation in the quality parameters data is determined by at least one of: binary segmentation algorithm, Pruned Exact Linear Time (PELT) algorithm, Z-score based algorithm. Herein, the data processing arrangement is configured to determine the variation in the quality parameters data by at least one of: binary segmentation algorithm, Pruned Exact Linear Time (PELT) algorithm, Z-score based algorithm. Such algorithms are known to be implemented for finding changepoints in sequential data, and thus may be utilized for present purposes as would be contemplated by a person skilled in the art, and thus have not been described herein in detail for the brevity of the present disclosure. That said, it may be appreciated that other suitable algorithms may be alternatively, or additionally, be utilized without any limitations.

The method further comprises generating an alert signal indicative of presence of a possible fake base station in the geological area based on the determined variation in the quality parameters data. Herein, the data processing arrangement is configured to generate an alert signal indicative of presence of a possible fake base station in the geological area based on the determined variation in the quality parameters data. In the present examples, if the determined magnitude of variation(s) (as discussed in the preceding paragraph) may exceed a certain predefined threshold, then the said alert signal indicative of presence of a possible fake base station in the geological area is generated. The said threshold may be defined based on required sensitivity, for example based on criticality of application area of the RAN, for detection of the anomaly therein. For instance, if the application area of the RAN is highly critical, then the threshold may be defined to be low, such that even smaller variation due to presence of any anomaly may trigger generation of the alert signal; and vice-versa.

Thereby, the present disclosure provides techniques for improving security of radio network selected geological location by using quality measurement data of wide communication network and fingerprinting variations in the local communication network. The system and the method of the present disclosure provide two improvements of data handling and teach about how to compare two improved data components in order to detect variation (possible security threats) in a radio environment. First improvement of data handling is to create a capability to point out and isolate selected locations radio quality data from all quality measurements and fingerprint it as a baseline for locations radio environment, which is being referred to as the first radio fingerprint. Second improvement of data handling is to measure quality variation that fake base station usually is causing in radio network by using already mentioned base station's quality measurement, with such variation being referred to as the second radio fingerprint. The objective is to find how out possible fake base station effects to real networks quality parameters data and use the variation therebetween for determining fake base station, and generate the alert signal thereby. As a consequence of detecting an anomaly based on generation of the alert signal, such as the possible fake base station, further analysis or corrective actions may be applied to the RAN. For example, the service engineer may be alerted to check the target geological area for confirming presence of any fake base station, or the like.

The system and the method of the present disclosure generally create a periodic monitoring for the first radio fingerprint to set as the reference and a constant prioritized monitoring for the second radio fingerprint, and further provide a comparison between the first radio fingerprint and the second radio fingerprint to determine variations therebetween. Constant monitoring may inform about any variations to normal situation (corresponding to the first radio fingerprint) and alert existence of any possible fake base stations based on the second radio fingerprint. The detection of the possible fake base stations in the RAN as per embodiments of the present disclosure is independent of user equipment measurements, with only the base station measurements sufficing.

Further, the teachings as per embodiments of the present disclosure may be implemented without need of installation of any additional hardware in the RAN.

DETAILED DESCRIPTION OF THE DRAWINGS

Referring to FIG. 1, illustrated is a schematic illustration of a block diagram of a system 100 for detecting an anomaly in a radio access network (RAN) 102, in accordance with an embodiment of the present disclosure. As shown, the RAN 102 comprises a plurality of base stations 110. The system 100 comprises a plurality of data collection devices 120, with each of the plurality of data collection devices 120 coupled with one of the plurality of base stations 110 associated with the RAN 102. The plurality of data collection devices 120 are configured to, collectively, monitor quality parameters data for a wide communication network established by the plurality of base stations 110. Further, each of the plurality of data collection devices 120 is configured to monitor quality parameters data for a local communication network corresponding to one of the base stations 110, of the plurality of base stations 110, installed in a geological area, wherein the local communication network is a subset of the wide communication network. The system 100 further comprises a data processing arrangement 130 disposed in signal communication with each of the plurality of data collection devices 120 to receive the quality parameters data for the wide communication network and the quality parameters data for the local communication network. The data processing arrangement 130 is configured to: define a first radio fingerprint based on the quality parameters data for the wide communication network; define a second radio fingerprint based on the quality parameters data for the local communication network; compare the first radio fingerprint and the second radio fingerprint to determine variation in the quality parameters data therebetween; and generate an alert signal indicative of presence of a possible fake base station in the geological area based on the determined variation in the quality parameters data.

Figure 2:
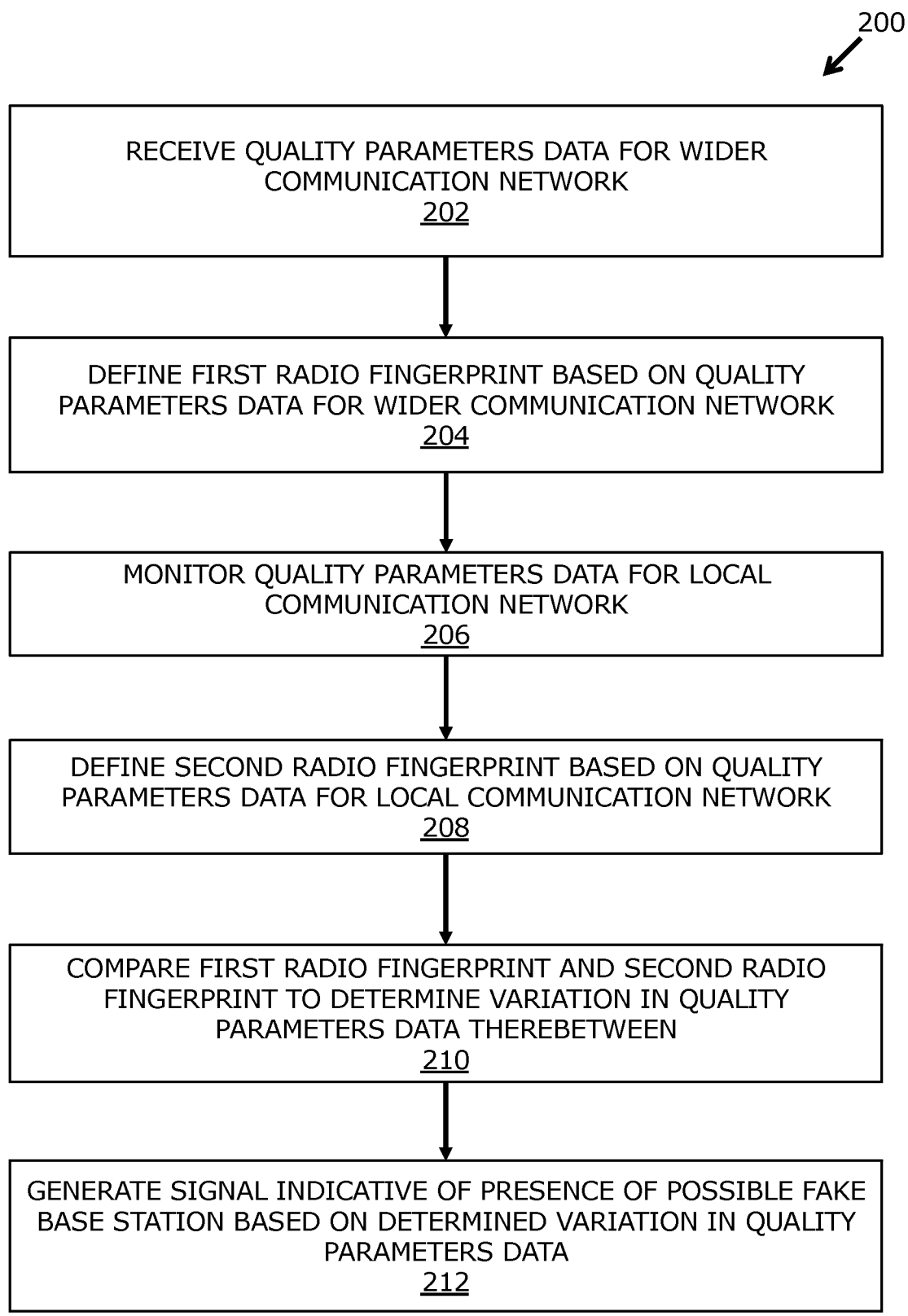
FIG. 2 is an illustration of a flowchart listing steps involved in a method for detecting anomaly in a radio access network, in accordance with an embodiment of the present disclosure.

Referring to FIG. 2, illustrated is a flowchart listing steps involved in a method 200 for detecting anomaly in a radio access network (RAN) (such as, the RAN 102 of FIG. 1), in accordance with an embodiment of the present disclosure. At a step 202, the method 200 comprises receiving quality parameters data for a wide communication network established by plurality of base stations associated with the RAN. At a step 204, the method 200 comprises defining a first radio fingerprint based on the quality parameters data for the wide communication network. At a step 206, the method 200 comprises monitoring, by one of the base stations (such as, the base stations 110), of the plurality of base stations, installed in a geological area, quality parameters data for a local communication network, wherein the local communication network is a subset of the wide communication network. At a step 208, the method 200 comprises defining a second radio fingerprint based on the quality parameters data for the local communication network. At a step 210, the method 200 comprises comparing the first radio fingerprint and the second radio fingerprint to determine variation in the quality parameters data therebetween. And, at a step 212, the method 200 comprises generating an alert signal indicative of presence of a possible fake base station in the geological area based on the determined variation in the quality parameters data.

It may be appreciated that the steps 202 to 212 are only illustrative, and other alternatives may also be provided where one or more steps are added, one or more steps are removed, or one or more steps are provided in a different sequence without departing from the scope of the present disclosure.

Figure 3:
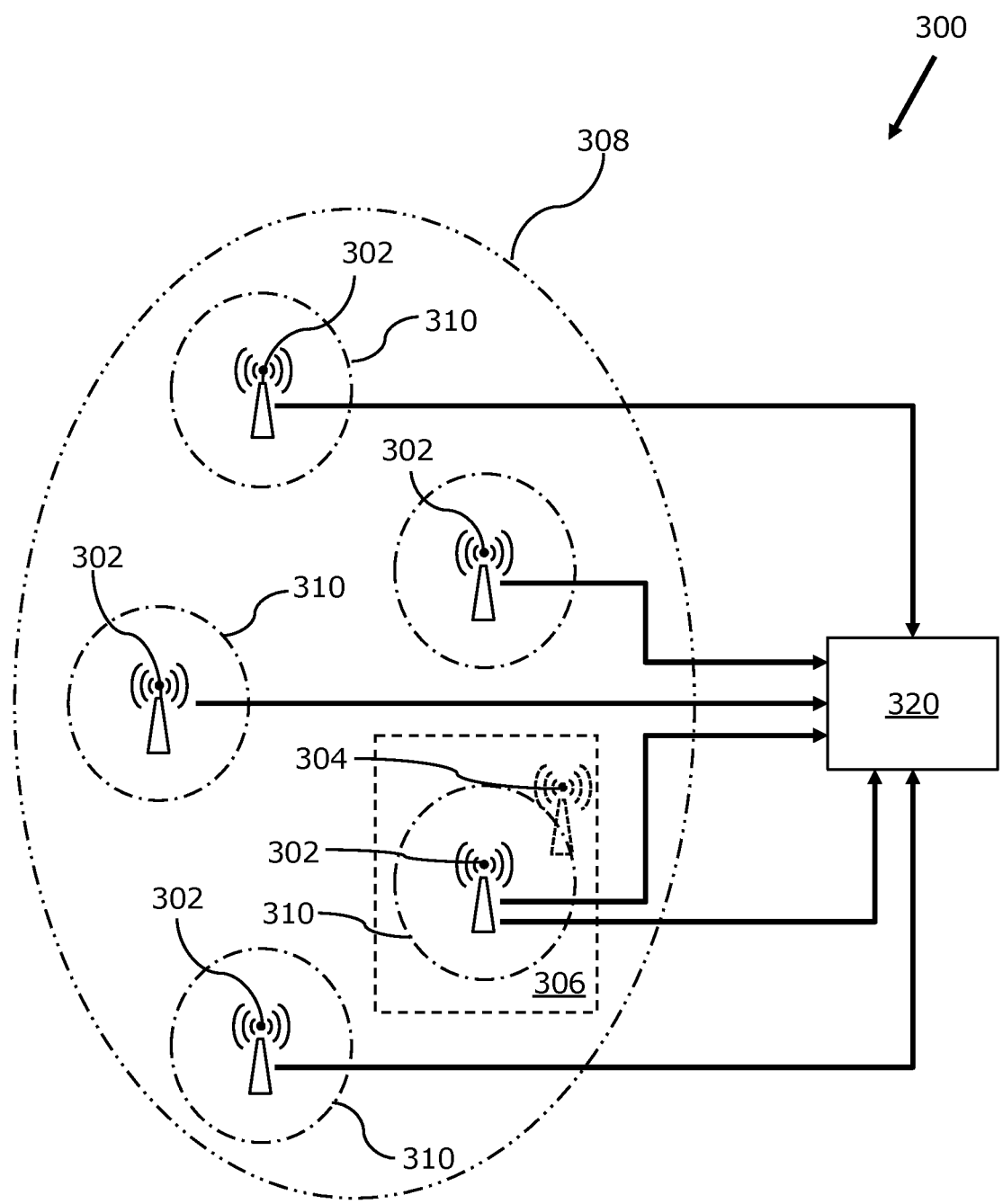
FIG. 3 is an exemplary graphical illustration of a radio access network with a plurality of base stations associated therewith and a possible fake base station installed therein in a geological area, and with schematic illustration of process flow for detecting anomaly in the radio access network, in accordance with an embodiment of the present disclosure.

Referring to FIG. 3, illustrated is exemplary graphical illustration of a radio access network (RAN) 300 with a plurality of base stations 302 associated therewith and a possible fake base station 304 installed therein in a geological area 306, and with schematic illustration of process flow for detecting anomaly in the radio access network 300, in accordance with an embodiment of the present disclosure. As illustrated, the plurality of base stations 302, collectively, establish a wide communication network (as represented by reference numeral 308). Further, each base station 302 establish a corresponding local communication network (as represented by reference numeral 310). Herein, the plurality of base stations 302 (specifically, a plurality of data collection devices (not shown) coupled thereto) are configured to, collectively, monitor quality parameters data for the wide communication network 308. Further, each base station 302 (specifically each of the plurality of data collection devices) is configured to monitor quality parameters data for the local communication network 310 installed in the geological area 306. Herein, the local communication network 310 is a subset of the wide communication network 308. The RAN 300 further comprises a data processing arrangement 320 disposed in signal communication with each of the plurality of base stations 302 to receive the quality parameters data for the wide communication network 308 and the quality parameters data for the local communication network 310. The data processing arrangement 320 is configured to: define a first radio fingerprint based on the quality parameters data for the wide communication network 308; define a second radio fingerprint based on the quality parameters data for the local communication network 310; compare the first radio fingerprint and the second radio fingerprint to determine variation in the quality parameters data therebetween; and generate an alert signal indicative of presence of the fake base station 304 in the geological area 306 based on the determined variation in the quality parameters data.

Additionally and/or alternatively, the wide communication network 308 is automatically optimized or controlled in response to the alert signal. For example, neighbour lists may be automatically managed for avoiding or preventing a fake base station from causing handover of a mobile terminal that attempts to setup an RRC connection to the fake base station.

Figure 4:
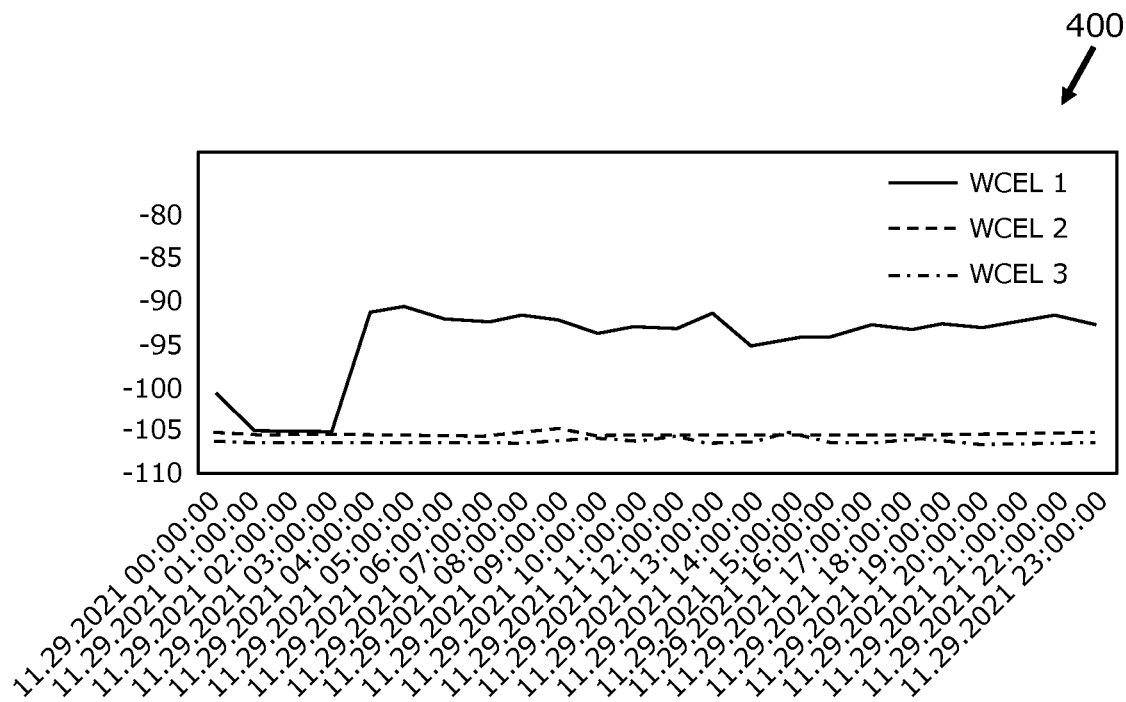
FIG. 4 is an exemplary graphical illustration depicting variation in RTWP in case of presence of possible fake base station in a radio access network, in accordance with an embodiment of the present disclosure.

Referring to FIG. 4, illustrated is an exemplary graphical illustration 400 depicting variation in RTWP in case of presence of possible fake base station in a radio access network, in accordance with an embodiment of the present disclosure. Specifically, the graphical illustration 400 provides example of changes in RTWP in case of RAN interference that may be monitored in the first radio fingerprint and the second radio fingerprint comparison in order to detect anomaly in the RAN. The graphical illustration 400 depicts plots for sum of average RTWP for three different WCEL, namely WCEL1, WCEL2 and WCEL3, which may correspond to different base stations. As shown in FIG. 4, there is a sudden change in the RTWP for WCEL1 at around 3:00 hours which may indicate introduction of some anomaly around that time (i.e., between 2:00 hours-3:00 hours), such as possible installation of a fake base station in the geological area corresponding to the WCEL 1.

Figure 5:
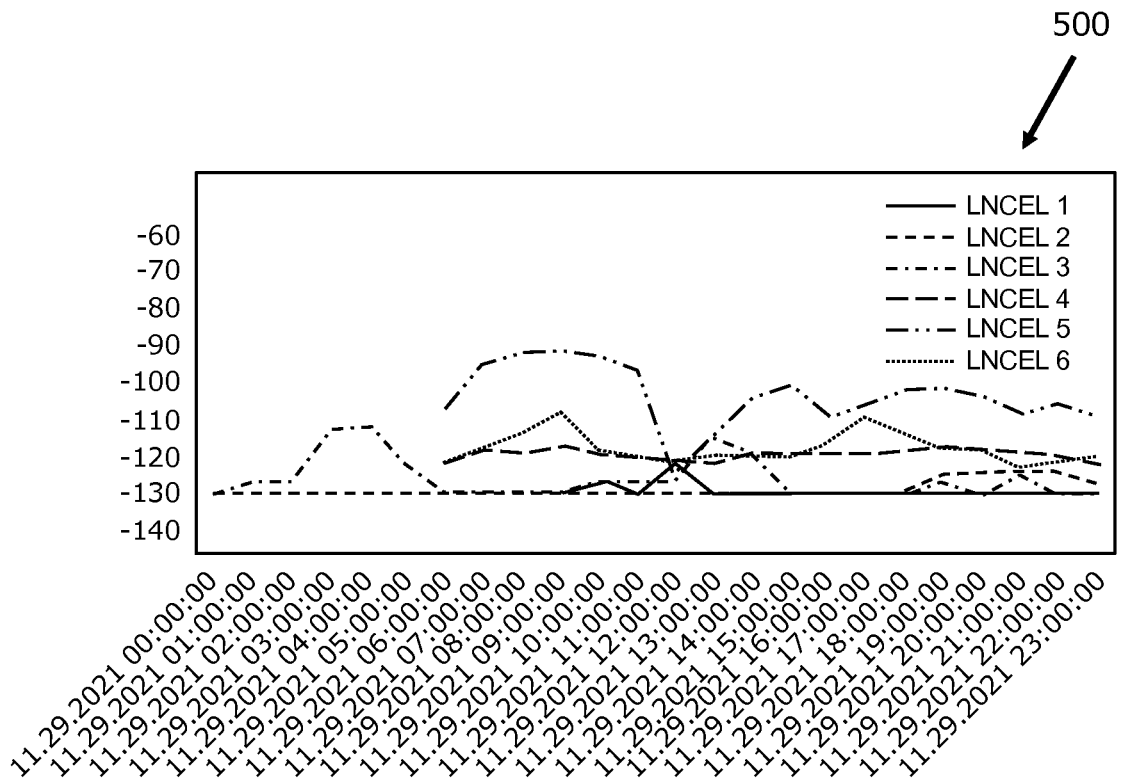
FIG. 5 is an exemplary graphical illustration depicting variation in RSSI in case of presence of possible fake base station in a radio access network, in accordance with an embodiment of the present disclosure.

Referring to FIG. 5, illustrated is an exemplary graphical illustration 500 depicting variation in RSSI in case of presence of possible fake base station in a radio access network, in accordance with an embodiment of the present disclosure. Specifically, the graphical illustration 500 provides example of changes in RSSI in case of RAN interference that may be monitored in the first radio fingerprint and the second radio fingerprint comparison in order to detect anomaly in the RAN. The graphical illustration 500 depicts plots for sum of average RSSI per cell PUCCH (Physical Uplink Control Channel) for six different LNCEL, namely LNCEL1, LNCEL2, LNCEL3, LNCEL4, LNCEL5 and LNCEL6, which may correspond to different base stations. As shown in FIG. 5, there are variations in the RSSI with significant variation in the LNCEL5, which may indicate presence of some anomaly, such as possible installation of a fake base station in the geological area corresponding to the LNCEL5. It may be noted that such variations in the LNCEL5 may in turn be causing variations (due to interference) in other LNCELs.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for detecting an anomaly in a radio access network (RAN), the method comprising:
   receiving quality parameters data for a wide communication network established by a plurality of base stations associated with the RAN;
   defining a first radio fingerprint based on the quality parameters data for the wide communication network, wherein defining the first radio fingerprint comprises:
      isolating the quality parameters data for one or more base stations of the plurality of base stations installed in a geological area from the received quality parameters data for the wide communication network, wherein the quality parameters data is isolated by using a clustering algorithm; and
      defining the first radio fingerprint based on the said isolated quality parameters data;
   monitoring, by one of the one or more base stations of the plurality of base stations, installed in the geological area, quality parameters data for a local communication network, wherein the local communication network is a subset of the wide communication network;
   defining a second radio fingerprint based on the quality parameters data for the local communication network;
   comparing the first radio fingerprint and the second radio fingerprint to determine a variation between the quality parameters data for the wide communication network and the quality parameters data for the local communication network, wherein the variation between the quality parameters data for the wide communication network and the quality parameters data for the local communication network is determined by at least one of: binary segmentation algorithm, Pruned Exact Linear Time (PELT) algorithm, Z-score based algorithm; and
   generating an alert signal indicative of a presence of a possible fake base station in the geological area based on the determined variation between the quality parameters data for the wide communication network and the quality parameters data for the local communication network.

2. The method according to claim 1 further comprising intermittently receiving the quality parameters data for the wide communication network after each first predefined interval of time.

3. The method according to claim 2 further comprising configuring the said one of the base stations installed in the geological area to monitor the quality parameters data for the local communication network after each second predefined interval of time, wherein the second predefined interval of time is smaller than the first predefined interval of time.

4. The method according to claim 1, wherein the quality parameters data for the wide communication network and the quality parameters data for the local communication network comprises one or more of: Received Total Wideband Power (RTWP), Received Signal Strength Indicator (RSSI), Signal to Interference Noise Ratio (SINR), GPS location verification, GPS signal strength.

5. A computer program product comprising a non-transitory computer readable medium with computer executable program code which when executed by a data processing arrangement causes a system to perform the method of claim 1.

6. A system for detecting anomaly in a radio access network (RAN) comprising a plurality of base stations, the system comprising:
- a plurality of data collection devices, with each of the plurality of data collection devices coupled with one of the plurality of base stations associated with the RAN,
- wherein the plurality of data collection devices are configured to, collectively, monitor quality parameters data for a wide communication network established by the plurality of base stations;
- wherein each of the plurality of data collection devices is configured to monitor quality parameters data for a local communication network corresponding to one of the base stations, of the plurality of base stations, installed in a geological area, wherein the local communication network is a subset of the wide communication network; and
- a data processing arrangement configured to:
  - receive the quality parameters data for the wide communication network;
  - define a first radio fingerprint based on the quality parameters data for the wide communication network, wherein the data processing arrangement is configured to:
    - isolate the quality parameters data for one or more base stations of the plurality of base stations, installed in the geological area from the received quality parameters data for the wide communication network, wherein the data processing arrangement is configured to isolate the quality parameters data by using a clustering algorithm; and
    - define the first radio fingerprint based on the said isolated quality parameters data;
  - receive the quality parameters data for the local communication network;
  - define a second radio fingerprint based on the quality parameters data for the local communication network;
  - compare the first radio fingerprint and the second radio fingerprint to determine a variation between the quality parameters data for the wide communication network and the quality parameters data for the local communication network, wherein the variation between the quality parameters data for the wide communication network and the quality parameters data for the local communication network is determined by at least one of: binary segmentation algorithm, Pruned Exact Linear Time (PELT) algorithm, Z-score based algorithm; and
  - generate an alert signal indicative of a presence of a possible fake base station in the geological area based on the determined variation between the quality parameters data for the wide communication network and the quality parameters data for the local communication network.

7. The system according to claim 6, wherein the plurality of data collection devices are configured to intermittently monitor the quality parameters data for the wide communication network after each first predefined interval of time.

8. The system according to claim 7, wherein each of the plurality of data collection devices is configured to monitor the quality parameters data for the corresponding local communication network after each second predefined interval of time, wherein the second predefined interval of time is smaller than the first predefined interval of time.

9. The system according to claim 6, wherein the quality parameters data for the wide communication network and the quality parameters data for the local communication network comprise one or more of: Received Total Wideband Power (RTWP), Received Signal Strength Indicator (RSSI), Signal to Interference Noise Ratio (SINR), GPS location verification, GPS signal strength.

* * * * *